United States Patent
Ahn et al.

(10) Patent No.: US 7,789,832 B2
(45) Date of Patent: Sep. 7, 2010

(54) ULTRASOUND SYSTEM AND METHOD FOR CONTROLLING STEERING ANGLES OF SCAN LINES

(75) Inventors: Chi Young Ahn, Seoul (KR); Jae Keun Lee, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 413 days.

(21) Appl. No.: 11/836,469

(22) Filed: Aug. 9, 2007

(65) Prior Publication Data
US 2008/0045837 A1 Feb. 21, 2008

(30) Foreign Application Priority Data
Aug. 18, 2006 (KR) .............. 10-2006-0078092

(51) Int. Cl.
*A61B 8/00* (2006.01)
(52) U.S. Cl. ............... 600/437; 600/443
(58) Field of Classification Search ......... 600/437, 600/453, 472, 459, 447; 73/584, 626, 625, 73/620, 618, 596, 586, 587; 367/61, 62, 367/103, 105, 119, 121, 122, 129, 138, 153, 367/154, 155
See application file for complete search history.

(56) References Cited

U.S. PATENT DOCUMENTS

| | | | |
|---|---|---|---|
| 6,790,181 B2 * | 9/2004 | Cai et al. | ............ 600/443 |
| 2004/0054284 A1 | 3/2004 | Cai et al. | |

FOREIGN PATENT DOCUMENTS

| | | |
|---|---|---|
| JP | 2004-154567 | 6/2004 |
| JP | 2005-169123 | 6/2005 |
| KR | 2001-0051946 | 6/2001 |

\* cited by examiner

*Primary Examiner*—Long V Le
*Assistant Examiner*—Nicholas L Evoy
(74) *Attorney, Agent, or Firm*—Oblon, Spivak, McClelland, Maier & Neustadt, L.L.P.

(57) ABSTRACT

An ultrasound system comprises: a probe having a transducer array of n transducer elements for transmitting ultrasound signals, said n transducer elements being associated with respective scan lines; a steering angle calculating unit for calculating steering angles of the scan lines by using series determined by a relation between the steering angles of at least two scan lines; and a control unit for controlling transmission of the ultrasound signals such that the ultrasound signals can be focused along the scan lines based on the calculated steering angles of the scan lines.

2 Claims, 5 Drawing Sheets

ULTRASOUND SYSTEM AND METHOD FOR CONTROLLING STEERING ANGLES OF SCAN LINES

The present application claims priority from Korean Patent Application No. 10-2006-0078092 filed on Aug. 18, 2006, the entire subject matter of which is incorporated herein by reference.

BACKGROUND

1. Field

The present invention generally relates to an ultrasound system, and more particularly to an ultrasound system and method for controlling steering angles of scan lines set at each transducer element in a curved linear probe.

2. Background

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional images of internal features of an object (e.g., human organs).

The ultrasound system generally uses a probe containing a wide bandwidth transducer to transmit and receive ultrasound signals. The ultrasound system forms images of human internal tissues by electrically exciting an acoustic transducer element or an array of acoustic transducer elements to generate ultrasound signals that travel into the body. The ultrasound signals produce ultrasound echo signals since they are reflected from body tissues, which appear as discontinuities to the propagating ultrasound signals. Various ultrasound echo signals return to the transducer element and are converted into electrical signals, which are amplified and processed to produce ultrasound data for an image of the tissues.

Recently, a curved linear probe containing a curved linear transducer array has been used to obtain an ultrasound image of a wide viewing angle. The curved linear probe transmits the ultrasound signals along scan lines, which are set in a normal direction of a probe face representing a surface of the curved linear probe for transmitting and receiving the ultrasound signals. The curved linear probe transmits the ultrasound signals in a radial shape, thereby obtaining a wider ultrasound image than a length of the curved linear probe. FIG. 1 is a schematic diagram illustrating a geometrical structure of scan lines set at each transducer element in the curved linear probe. As illustrated in FIG. 1, if each scan line is extended backward from the transducer elements 12, then all the scan lines pass through a specific point 30 (hereinafter referred to as a "common point"). If the common point is moved as shown in FIG. 2, then a steering angle of the scan line is defined according to a position of the moved common point. Then, the scan lines 22 are set according to the defined steering angle so that an ultrasound image having a wider viewing angle can be obtained.

However, when the common point 30 varies, the conventional ultrasound system must calculate the steering angle of each scan line set at each transducer element. Therefore, there is a problem in that an extensive amount of time is consumed due to the need to perform complex steering angle calculations.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

The present invention provides an ultrasound system and a method for controlling scan lines according to variation of a steering angle. Hereinafter, one embodiment of the present invention will be described with reference to the accompanying drawings.

Figure 3:
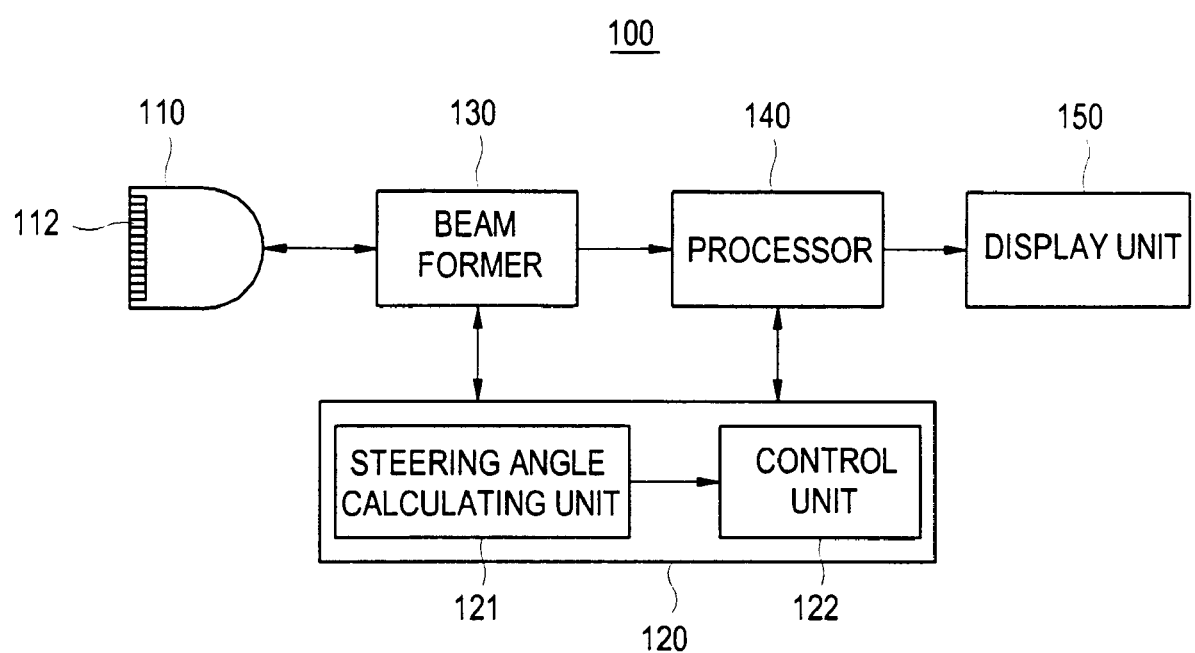
FIG. 3 is a block diagram illustrating an ultrasound system constructed in accordance with one embodiment of the present invention.

FIG. 3 is a block diagram schematically showing an ultrasound system constructed in accordance with one embodiment of the present invention. As shown in FIG. 3, the ultrasound system 100 includes a curved linear probe 110, a scan line setting unit 120, a beamformer 130, a processor 140 and a display unit 150.

The curved linear probe 110 includes a curved linear transducer array containing a plurality of transducer elements. The curved linear probe 110 transmits ultrasound signals to the target object and then receives ultrasound echo signals reflected from the target object.

The scan line setting unit 120 includes a steering angle calculating unit 121 and a control unit 122, as shown in FIG. 3. The steering angle calculating unit 121 sets the steering angles of the scan lines to be positioned at both ends of a transducer array 112 of the curved linear probe 110. After calculating the steering angles of the scan lines to be positioned at both ends, the steering angle calculating unit 121 calculates the steering angles of the scan lines positioned between the two scan lines disposed at both ends by using series. The series may preferably be determined based on the calculated steering angles of the scan lines positioned at both ends. The steering angles of the scan lines at both ends may be set by a user or the ultrasound system.

Figure 1:
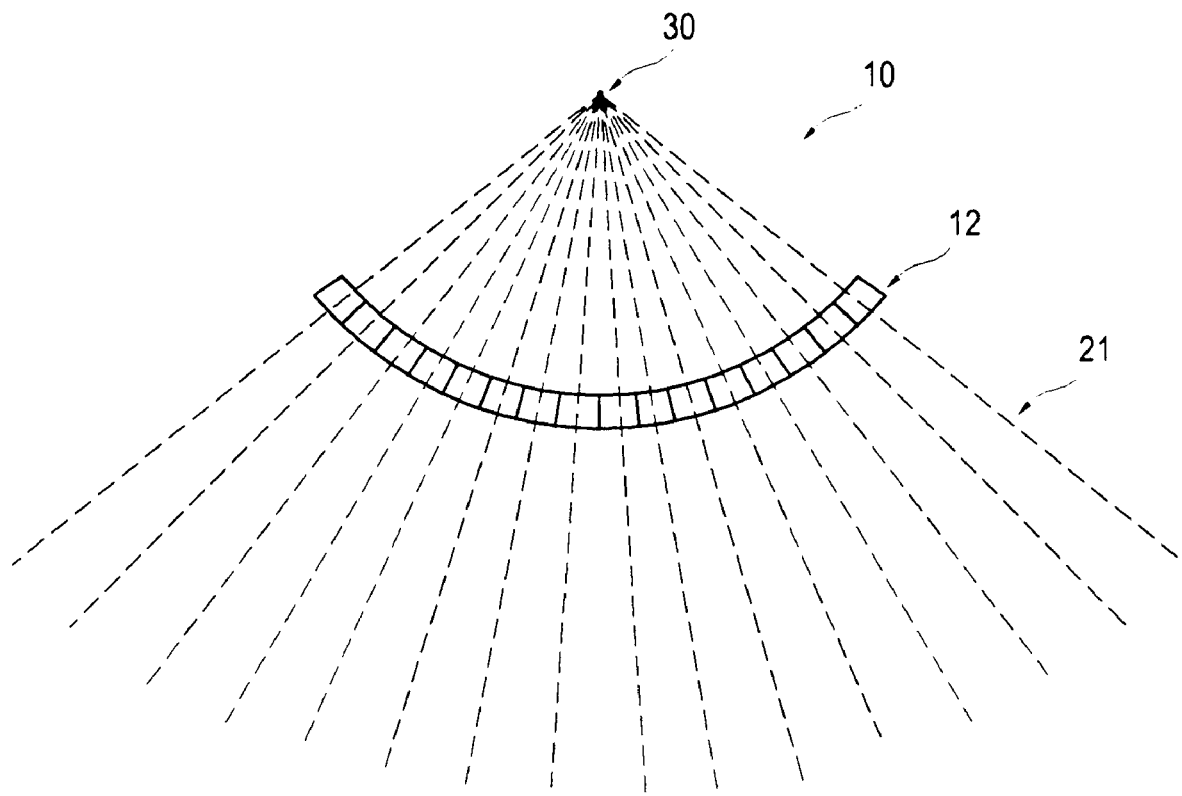
FIG. 1 is a schematic diagram illustrating a geometrical structure of scan lines set at each transducer element in the curved linear probe.
Figure 2:
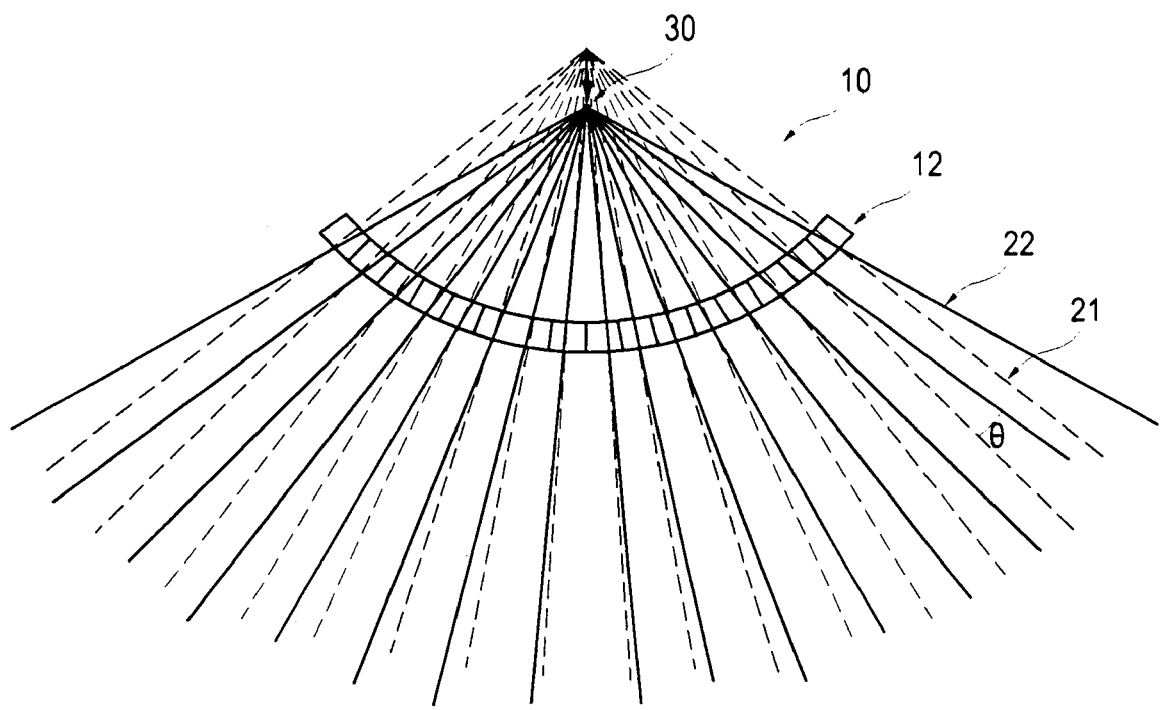
FIG. 2 illustrates scan lines set by varying steering angles in a curved linear probe.
Figure 4:
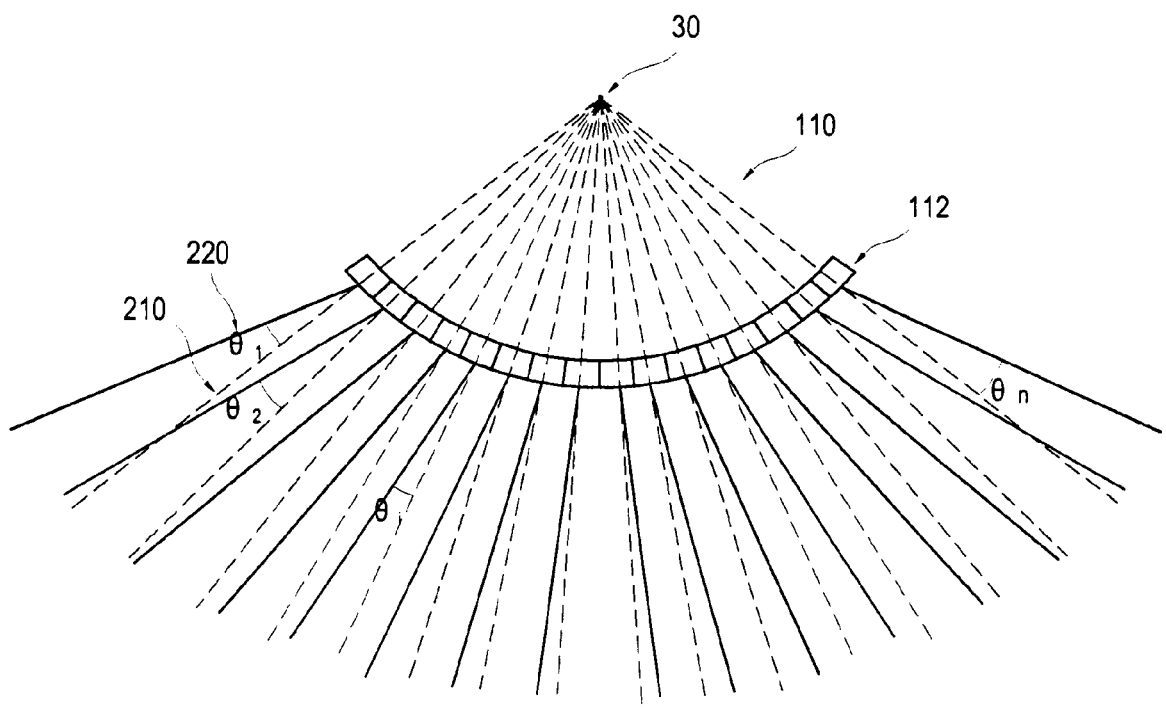
FIG. 4 is an exemplary diagram showing an example of setting steering angles in accordance with one embodiment of the present invention.

Hereinafter, a process for calculating the steering angels of the scan lines for each transducer element will be described in view of FIG. 4. In FIGS. 1 and 4, the same reference numerals are used to denote identical elements.

The steering angle calculating unit 121 first sets the steering angle of the scan line at the transducer element positioned at one end among the plurality of transducer elements (e.g., n transducer elements). Then, the steering angle of the scan line at the transducer element, which is positioned at the other end, is determined. For example, if a first steering angle $\theta_1$ of a scan line set at a first transducer element positioned at one end of the transducer array is determined by the user or the ultrasound system 100, then the steering angle calculating unit 121 calculates a $n^{th}$ steering angle $\theta_n$ of a scan line set at a $n^{th}$ transducer element based on the steering angle $\theta_1$. That is, the steering angle calculating unit 121 may determine the steering angle $\theta_n$ of the scan line as $-\theta_1$, i.e., $\theta_n = -\theta_1$.

The steering angle calculating unit 121 calculates the $i^{th}$ steering angle $\theta_i$ of a scan line set at the $i^{th}$ transducer element by using arithmetic series. For example, the $i^{th}$ steering angle $\theta_i$ may be calculated using the following equation (1)

$$\theta_i = \theta_1 + (i-1) \times \theta_d \quad (1)$$

wherein $\theta_d$ represents a common difference. The steering angle calculating unit 121 calculates the common difference $\theta_d$ based on the calculated steering angles $\theta_1$ and $\theta_n$. That is, the common difference $\theta_d$ can be calculated using the following equation (2) by applying $\theta_n = -\theta_1$ to $\theta_n = \theta_1 + (n-1) \times \theta_d$.

$$\theta_d = (2\theta_n)/(n-1) \quad (2)$$

The steering angle calculating unit 121 calculates the steering angles of the scan lines set at respective transducer elements by using equations (1) and (2).

Figure 5:
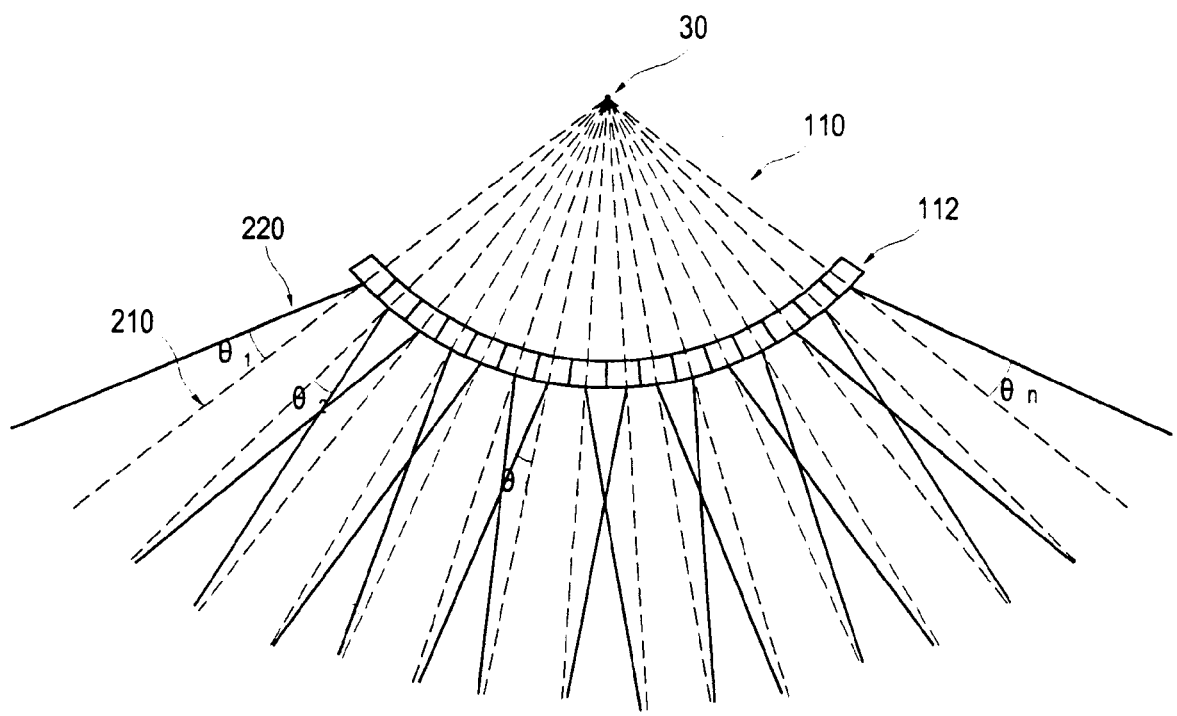
FIG. 5 is an exemplary diagram showing an example of setting steering angles in accordance with another embodiment of the present invention.

Hereinafter, a process for calculating the steering angles of the scan lines set at each transducer element in accordance with another embodiment of the present invention will be described in view of FIG. 5. In FIGS. 1 and 5, the same reference numerals denote identical elements.

The steering angle calculating unit 121 first sets the steering angle of the scan line at the transducer element positioned at one end among the plurality of transducer elements (e.g., n transducer elements). Then, the steering angle of the scan line at the transducer element, which is positioned at the other end, is determined. For example, if the first steering angle $\theta_1$ of a scan line set at a first transducer element positioned at one end of the transducer array is determined by the user or the ultrasound system 100, then the steering angle calculating unit 121 calculates the $n^{th}$ steering angle $\theta_n$ of a scan line set at the $n^{th}$ transducer element based on the steering angle $\theta_1$. The steering angle calculating unit 121 may determine the steering angle $\theta_n$ of the scan line as $-\theta_1$, i.e., $\theta_n = -\theta_1$.

The steering angle calculating unit 121 calculates the $i^{th}$ steering angle $\theta_i$ of a scan line set at the $i^{th}$ transducer element by using geometric series. For example, the $i^{th}$ steering angle $\theta_i$ may be calculated using the following equation (3).

$$\theta_i = \theta_1 \times \theta_r^{(i-1)} \quad (3)$$

wherein $\theta_r$ represents a geometric ratio. The steering angle calculating unit 121 calculates the geometric ratio $\theta_r$ based on the calculated steering angles $\theta_1$ and $\theta_n$. The steering angle calculating unit 121 calculates the steering angle $\theta_n$ through equation (3), i.e., $\theta_n = \theta_1 \times \theta_r^{(n-1)}$. When $\theta_n = -\theta_1$, $\theta_r$ is equal to $-1$. The steering angle calculating unit 121 calculates the steering angles of the scan lines set at respective transducer elements by using the calculated geometric ratio $\theta_r$ and equation (3).

The control unit 122 controls the operations of the beamformer 130 and the processor 140 based on the steering angles calculated by the steering angle calculating unit 121. The control unit 122 controls the beamformer 130 such that the ultrasound signals are focused along the scan lines 220, which are steered in the steering angles as shown in FIGS. 4 and 5. Also, the control unit 122 is responsive to signals outputted from the beamformer 130 to control the processor 140 to form ultrasound image signals based on scan line information.

The beamformer 130 controls transmit pulse signals such that the ultrasound signals generated in the transducer elements of the probe 110 in response to the transmit pulse signals are focused on the scan lines, which are steered in the calculated steering angles. Also, the beamformer 130 applies delays to receive signals, which are electrical signals converted from ultrasound echo signals in the transducer elements of the probe 110, to form receive-focused signals.

The processor 140 is responsive to the receive-focused signals outputted from the beamformer 130 to form ultrasound image signals based on the scan line information. The display unit 150 receives the ultrasound image signals and then displays an ultrasound image based on the ultrasound image signals.

As mentioned above, the steering angles of the scan lines set at respective transducer elements in the curved linear probe are calculated by using the series in accordance with the present invention. Therefore, the steering angles can be easily and rapidly calculated without using high-performance hardware or software.

An ultrasound system comprises: a probe having a transducer array of n transducer elements for transmitting ultrasound signals, said n transducer elements being associated with respective scan lines; a steering angle calculating unit for calculating steering angles of the scan lines by using series determined by a relation between the steering angles of at least two scan lines; and a control unit for controlling transmission of the ultrasound signals such that the ultrasound signals can be focused along the scan lines based on the calculated steering angles of the scan lines.

A method for controlling scan lines in an ultrasound system having a probe containing a transducer array of n transducer elements for transmitting ultrasound signals, said n transducer elements being associated with respective scan lines, comprising: a) calculating steering angles of the scan lines by using series determined by a relation between the steering angles of at least two scan lines; and b) controlling transmission of the ultrasound signals such that the ultrasound signal can be focused along the scan lines based on the calculated steering angles of the scan lines.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
   a curved linear probe having a transducer array of n transducer elements for transmitting ultrasound signals, said n transducer elements being associated with respective scan lines, n being a positive integer greater than 2;

a steering angle calculating unit configured to set steering angles of scan lines at $1^{st}$ and $n^{th}$ transducer elements positioned at both ends of the transducer array, calculate a geometric ratio of the steering angles based on the set steering angles, and calculate remaining steering angles of remaining scan lines at the respective transducer elements by using geometric series determined according to the geometric ratio; and a control unit configured to control transmission of the ultrasound signals such that the ultrasound signals are focused along the scan lines based on the calculated steering angles of the scan lines.

2. A method for controlling scan lines in an ultrasound system having a curved linear probe containing a transducer array of n transducer elements for transmitting ultrasound signals, said n transducer elements being associated with respective scan lines, n being a positive integer greater than 2, the method comprising:

a) setting steering angles of scan lines at $1^{st}$ and $n^{th}$ transducer elements positioned at both ends of the transducer array;

b) calculating a geometric ratio of the steering angles based on the set steering angles;

c) calculating the steering angles of remaining scan lines at the respective transducer elements by using geometric series determined according to the geometric ratio; and d) controlling transmission of the ultrasound signals such that the ultrasound signals are focused along the scan lines based on the calculated steering angles of the scan lines.

* * * * *